(12) United States Patent
Baumann et al.

(10) Patent No.: US 7,110,123 B2
(45) Date of Patent: Sep. 19, 2006

(54) PIG SENSOR ARRANGEMENT FOR HIGH VOLTAGE COATING SYSTEM

(75) Inventors: Michael Baumann, Flein (DE); Siedfrieg Poppe, Unterriexingen (DE); Hidetoshi Yamabe, Tokyo (JP)

(73) Assignee: Durr Systems, Inc., Plymouth, MI (US)

( * ) Notice: Subject to any disclaimer, the term of this patent is extended or adjusted under 35 U.S.C. 154(b) by 331 days.

(21) Appl. No.: 10/630,264

(22) Filed: Jul. 30, 2003

(65) Prior Publication Data

US 2004/0075848 A1    Apr. 22, 2004

(51) Int. Cl.
G01B 11/14   (2006.01)
G01J 4/00    (2006.01)

(52) U.S. Cl. ............... 356/614; 356/620; 356/369

(58) Field of Classification Search ............... 356/614, 356/364, 369, 615, 620, 622; 250/559.09, 250/559.11, 559.29, 559.3, 559.32, 225
See application file for complete search history.

(56) References Cited

U.S. PATENT DOCUMENTS 4,931,635 A * 6/1990 Toyama ................ 250/225

FOREIGN PATENT DOCUMENTS

| DE | 10033987 | | 1/2002 |
| DE | 10131562 | | 1/2003 |
| DE | 101 61 550 | A1 * | 6/2003 |
| EP | 0319172 | | 9/1992 |
| EP | 1 319 439 | A1 * | 6/2003 |

* cited by examiner

Primary Examiner—Gregory J. Toatley, Jr.
Assistant Examiner—Roy M. Punnoose
(74) Attorney, Agent, or Firm—Howard & Howard

(57) ABSTRACT

A sensor for a conductive coating delivery system subject to high voltage including a movable member, such as a pig received through a delivery line having a magnet and a sensor in the delivery system subject to high voltage including an optically polarizing device subject to magneto-optical change upon approach of the magnet generating a polarized light signal, optical fibers connected to the sensor receiving the polarized light signal connected to an electrical device situated remotely from the high voltage generating an electrical signal for controlling a valve, metering pump or the like.

14 Claims, 2 Drawing Sheets

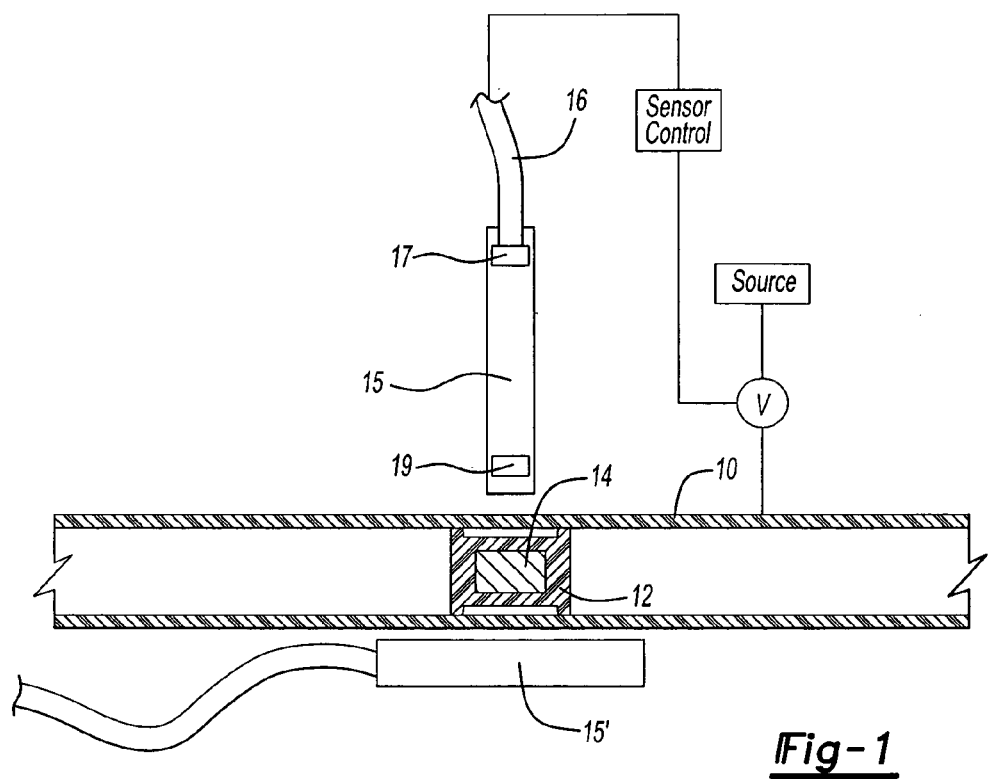
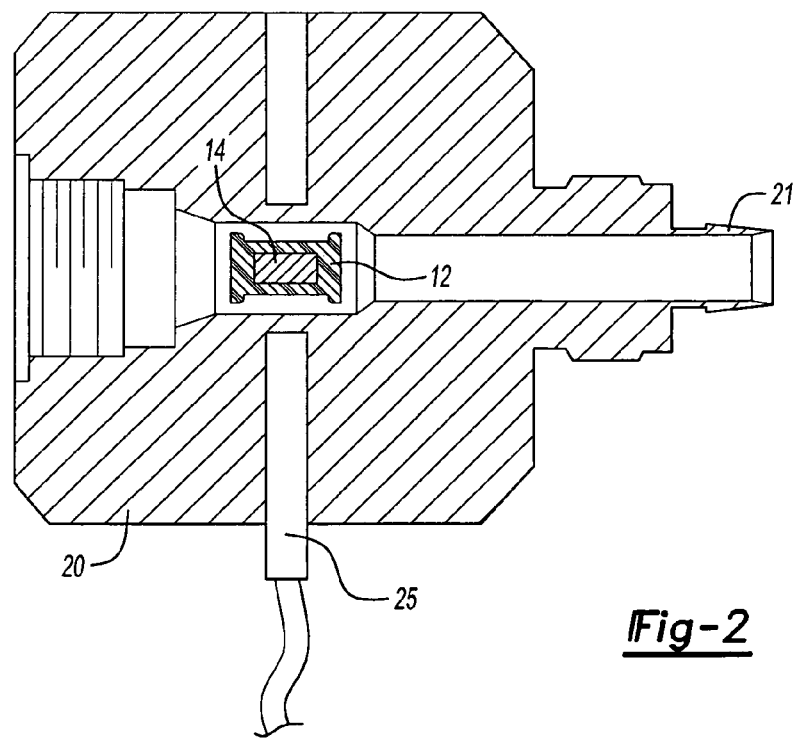
Fig-1
Fig-2

PIG SENSOR ARRANGEMENT FOR HIGH VOLTAGE COATING SYSTEM

FIELD OF THE INVENTION

This invention relates to a sensor arrangement for a system used for series coatings of work pieces, such as automotive bodies, in which the coating material is conventionally charged to a high voltage and a pig or movable element is disposed in the delivery line or lines which receive conductive coatings, solvents, etc., and the sensor arrangement is utilized to sense the location of the pig or movable element.

BACKGROUND OF THE INVENTION

Electrostatic coating application systems for conductive coatings, such as water base paint, for mass production applications are known in the art. In a typical application, a series of work pieces, such as automotive bodies, are conveyed through a paint booth, wherein each work piece may be coated, for example, with a different color paint. In such applications, the coating apparatus typically includes a color changer, a rotary atomizer and a line connecting the color changer and the rotary atomizer, either directly or through a paint cannister. Following each application of coating or paint, the line or lines are generally purged with a solvent, typically ionized water for water base paint. However, similar systems may be utilized for powder coating materials. One means of transmitting the paint or solvent through the lines includes a movable member, such as a pig or pigging element, which is transmitted through the line or lines to either push the coating, separate one coating from another coating, or separate the coating from a solvent, etc. In paint application systems having one or more pigs or pigging elements, it is also conventional to include one or more pig stations. For example, the coating delivery system may, for example, include a first pig station adjacent the color changer and a second pig station adjacent the applicator which is typically a rotary atomizer which imparts a high voltage to the coating. Where the coating delivery system includes an intermediate cannister, the coating delivery system may, for example, include four pig stations, including a first pig station adjacent the color changer, a second pig station adjacent the cannister inlet, a third pig station adjacent the cannister outlet and a fourth pig station adjacent the applicator.

As will be understood, in such coating application systems, it is necessary to determine the location of a movable element or pig in the system under high voltage conditions. For example, a valve may be opened to supply coating material or solvent to the line upon receipt of a pig in a pig receiver station. Typically, the pigs are moved or transferred back and forth between the pig stations. One method of locating a pig in a coating delivery system is to utilize a magnet or other magnetically acting transmitter element in the pig and utilize a magnet sensor in the pig station or adjacent the delivery line. However, where the coating is conductive and subject to high voltage, conventional sensing and actuator systems may not be accurate or require complicated hardware or software as set forth below. Other examples of movable members are the shaft of a metering pump, a rotary atomizer, etc. used in water base paint applications subject to high voltage.

In one disclosed embodiment, the position or movement of which needs to be determined within a section of such a paint application system that is connected to a high voltage, are pigs that can be moved back and forward between pig stations of a color supply line. For example, EP 0 319 172, DE 100 33 987 and DE 101 31 562 describe methods in which a high voltage is applied to the pig stations on the atomizer side during the coating operation of the atomizer via the electrically conductive paint column. Special initiators with pneumatic switches are utilized for determining the pig positions in the lines and pig stations that are connected to a high voltage, wherein said pneumatic switches respond to magnets integrated into the pig body and able to operate under a high voltage. However, a high space requirement and undesirably long reaction times need to be accepted in this case. Similar problems occur in other system sections as described below.

The invention is based on the objective of disclosing a sensor arrangement that makes it possible to determine the position or movement of a moving member within a section of the coating system that is connected to a high voltage without delay and in a space-saving fashion. This objective is attained with the sensor arrangement of this invention.

SUMMARY OF THE INVENTION

The sensor for a coating delivery system of this invention includes a movable member, such as a pig, including a magnetically acting transmitter element, such as a permanent magnet, for signaling the position or movement of the movable member, and a sensor element responsive to the magnetically acting transmitter element in a portion of the delivery system subject to high voltage, wherein the sensor element includes an optical polarization device subject to magneto-optical change upon approach of the magnet, generating a polarized light signal, and wherein the sensor includes optical fibers connected to the polarization device and wherein the polarization device is located in a section of the coating delivery system subject to high voltage. The optical fibers are connected to an electronic device that is situated remotely from the high voltage region which generates an electric signal that corresponds to the light signal received from the polarization device through the optical fibers. In the disclosed embodiment, the sensor element includes a reflector that reflects the light arriving the polarization device to an analyzer, wherein a refractive element or prism turns the polarized light transmitted between the polarization device and the reflector.

The sensor element including the polarization device may be located adjacent a coating delivery line which transmits the movable element or pig or the sensor may be located in a pig station of the coating delivery system. The sensor element and the magnetically transmitting element may also be arranged in or on a valve to determine the switching position of the valve that operates under high voltage and can be switched in a remote-controlled fashion, wherein the valve element can be displaced between two switching positions and releases the path for a medium flowing through the valve in one switching position, while the valve is blocked when the valve element is situated in the other switching position. In this case, the magnetically transmitting element is arranged in a component that can be displaced with the valve element and the sensor element is arranged in or on a component of the valve that remains stationary relative to the valve element.

The magnetic-optic sensor systems to be used in accordance with the invention utilize, for example, the Faraday effect or, in other words, the rotation of the polarization direction of linearly polarized light waves during the passage through an isotropic medium under the influence of a magnetic field. Alternatively, the sensor systems may also utilize the known magneto-optical Kerr effect. The magnetically acting transmitting element may consist of a permanent magnet or an element of iron, steel or another material with ferromagnetic properties that makes it possible to change the magnetic field of a magnetic element situated or encapsulated in the sensor system. Sensor systems of this type are available on the market for other purposes, e.g., in the form of position sensors for the rudders and elevators of airplanes, in which they are used as a replacement for the fly-by-wire technique (EP 0 319 172). When used in electrostatic coating systems, however, these sensor systems have the surprising or unexpected advantage that they are easily able to operate under a high voltage. In comparison with pneumatic switches used for this purpose in electrostatic coating systems, in particular, as pig sensors, the sensor systems utilized in accordance with the invention have a smaller structural size and significantly shorter reaction times. These are particularly important aspects for an automated control of the coating operation in modern series coating systems. These advantages are preferably attained without any active electric elements in the sensor which would require a battery under the given high voltage conditions and would have a correspondingly short service life. Other advantages of the magnetic-optic sensor system can be seen in the fact that it does not require any balancing and no complicated software for the program control of the coating system.

BRIEF DESCRIPTION OF THE DRAWINGS

FIG. 1 is a side, partially cross-sectioned view of a fluid delivery line, a pigging element having a magnet and a sensor arrangement;

FIG. 2 is a side cross-sectional view of a pig station including the sensor arrangement of this invention;

DESCRIPTION OF THE PREFERRED EMBODIMENTS

Figure 3:
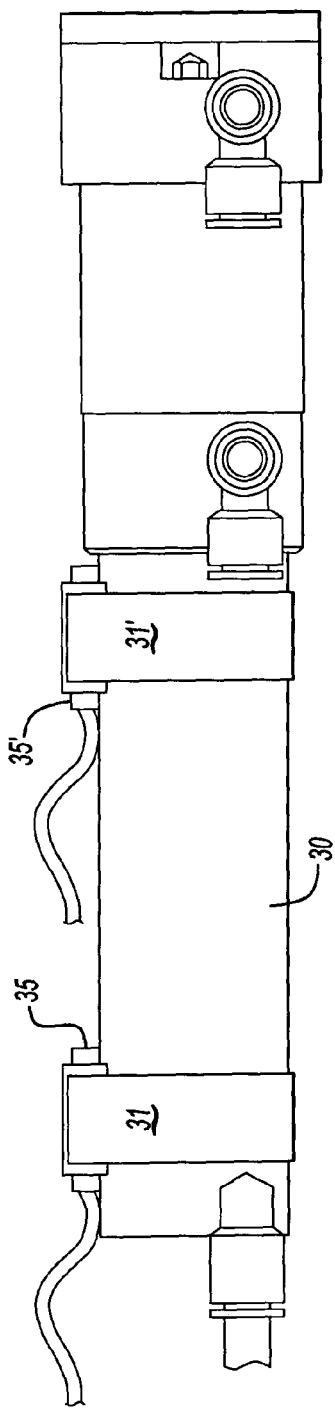
FIG. 3 is a pneumatic cylinder having the sensor arrangement of this invention.

FIG. 1 shows a paint line 10 that delivers an electrically conductive coating material, e.g., water base paint, to a (not-shown) electrostatic atomizer that charges the coating material situated in the paint line 10 to a high voltage. A pig 12 is moved backward and forward in the line 10 in order to transport the coating material and/or solvent to clean the line, wherein the movement of the pig past a certain location needs to be signaled to the control system. For this purpose, a magnetically acting transmitting element, e.g., a permanent magnet 14, is integrated or preferably encapsulated into the polymeric body of the pig, wherein a pig sensor 15 arranged at the concerned location responds to this transmitting element. The pig sensor 15 preferably consists of a relatively thin, long cylindrical housing that contains a polarization device 17 that is connected to an arrangement 16 of two optical fibers, wherein one optical fiber transmits light to, for example, a diode and the other fiber transmits light signals generated by the sensor to an electronic device that is preferably situated remotely from the high-voltage region and serves for generating an electric signal that corresponds to the light signal. The polarizer 17 linearly polarizes the received light. The polarized light is reflected by a mirror or reflector 19 situated on the end face of the sensor housing. For example, the polarized light may be reflected to a polarization detector or analyzer by means of a refractive element (Faraday effect element) in accordance with FIG. 15 of U.S. Pat. No. 4,931,635, the disclosure of which is incorporated herein by reference. This polarization detector or analyzer may form part of the polarization device and be connected to the output fiber on its opposite side. In the normal state, the polarized light reaches the output fiber in an unobstructed fashion. However, when the sensor is situated in the magnetic field of the pig 12, the Faraday effect causes the linearly polarized light to be turned in dependence on the field intensity such that its path into the output fiber is blocked. The change in the light signal is evaluated by the remote electronic device. It would also be conceivable to utilize a sensor that operates in accordance with the magneto-optical Kerr effect and in which the polarization of light reflected on a magnetized ferromagnetic mirror is changed. In FIG. 1, the polarized light is received and detected by a control which is connected to a valve "V" which controls the flow of fluid, such as solvent from a source to delivery line 10.

Magneto-optical sensors of the cylindrical shape shown are available on the market and have, for example, a diameter of approximately 3–8 mm and a length of 20 mm. An "Optical Speed Sensor" of the type described is available from TEIJUIN SEIKI Co., Ltd. of Yokohama-Shi, Japan. The arrangement 16 of optical fibers preferably is flexible such that it can be easily installed within the coating system.

The pig sensor 15 is arranged such that the longitudinal axis of its cylindrical housing extends transverse to the moving direction of the pig 12 and its end face faces the magnet 14. A similar pig sensor 15' may be additionally or alternatively arranged on the line 10 such that its longitudinal axis extends parallel to the moving direction.

FIG. 2 shows a pig station 20 of a generally known coating system with scraped lines. For example, the pig line 10 (FIG. 1) may be connected to the connection 21 of the pig station 20. Within the pig station, the pig 12 that contains the magnet 14 or other magnetically acting transmitter element is situated in an end position that is monitored and signaled by the pig sensor 25. The pig sensor 25 installed into the pig station may correspond to the above-described sensor 15 with respect to its shape, position and function.

One of the advantages of the described sensor system can be seen in the fact that it is not only suitable as a pig sensor, but can also be used on other sections of the electrostatic coating system that may (but do not have to) be connected to a high voltage in a largely unaltered fashion. FIG. 3 shows one example in the form of a pneumatic cylinder 30 as is, among other things, required as a pneumatic linear drive for a line disconnect coupling situated in the vicinity of the atomizer and for other sections of the coating system that are connected to a high voltage. At least one (not-shown) magnet or other magnetically acting transmitter is arranged on the piston rod that can be displaced in the pneumatic cylinder, wherein one respective sensor 35 and 35' of the described type responds to the magnet or magnetically acting sending in both end positions of the piston. In the position shown, both sensors can be easily mounted on the pneumatic cylinder 30 parallel to the moving direction of the piston by means of brackets 31, 31'.

Similar to the pneumatic cylinder shown, the piston end positions can also be monitored and signaled in piston metering cylinders that are connected to a high voltage and used in conventional coating systems for realizing a metered fluid delivery.

Figure 4:
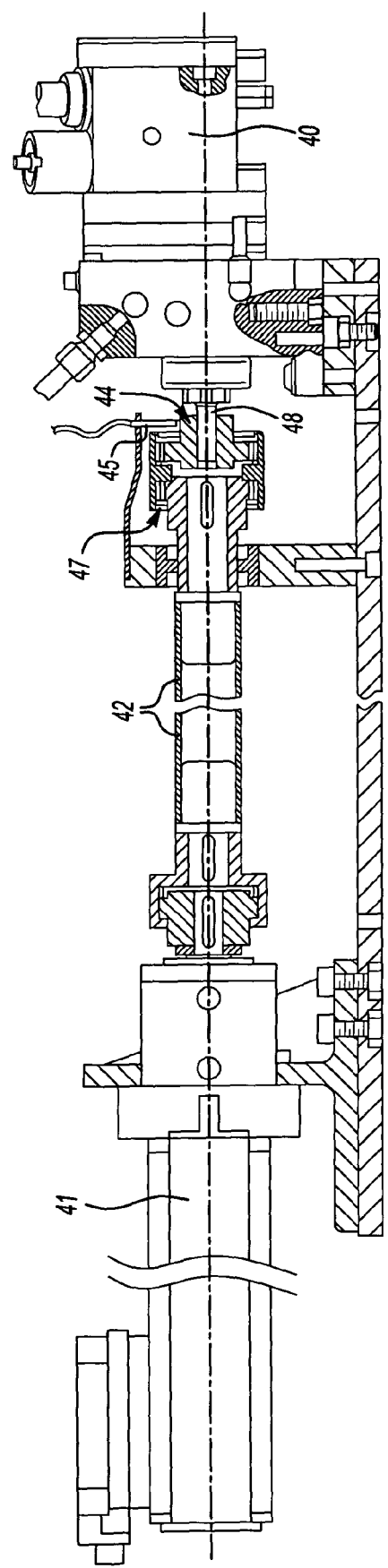
FIG. 4 is a metering pump for coating material having the sensor arrangement of this invention.

FIG. 4 shows another example in the form of a gear pump or other metering pump 40 for the metered delivery of water base paint that can be charged to a high voltage by a proximal atomizer. The metering pump 40 is driven by a driving motor 41 via a shaft 42 of an insulating material and a clutch 47. In such metering pump arrangements, a fracture of the insulating shaft 42 or a clutch failure may lead to the unnoticed stopping of the metering pump 40 while of the driving motor 41 continues to rotate. In order to monitor the pump function, a magnetically acting transmitter element, e.g., a magnet 44, is directly mounted on the input shaft of the pump, for example, on a clutch element 48 that is seated on and rotates with the input shaft, wherein said transmitter responds to the sensor 45 of the above-described type which is stationarily arranged in the vicinity of the clutch element 48. When the pump comes to a stop, the light signal generated by the sensor 40 during normal operation due to the cyclic passage of the magnet 44 is correspondingly changed. Since the light signal also changes with the frequency of the polarization change in the sensor 45, this example, in particular, indicates that the described sensor system is also suitable for measuring the rotational speed of rotating parts in an electrostatic coating system that are connected to a high voltage. The signal evaluation or the measurement of the rotational speed may take place in the electronic device situated remotely from the high-voltage region.

Another not-shown example for utilizing the invention consists of the sensor element and the magnetically acting transmitter element forming collision protection elements for a machine of the electrostatic coating system which moves an electrostatic coating tool or other tool. In this case, one element is arranged in or on a stationary part of the machine and the other element is arranged in or on a part that moves relative to the stationary part during a collision of the tool. One typical example for this is the arrangement of the magnetically acting transmitting element on the mounting flange of an atomizer that, for example, is exchangeably mounted on a coating robot and moves relative to its mounting flange when it collides with the workpiece to be coated or another part of the system. In this case, the sensor is arranged on the mounting flange of the robot in the vicinity of the magnetically acting transmitting element, wherein one utilizes the change in the light signal that occurs when the influence of the magnetic field on the sensor or the influence of the magnetic field in the sensor becomes weaker or disappears. The sensor system is particularly suitable for a collision protection device of the type described in DE 101 15 661, the disclosure of which is incorporated by reference. Similarly, the transmitting element may also be arranged in or on an electrostatic atomizer or another tool that is exchangeably mounted on a holding element of a motive machine of the coating system, wherein the sensor element is arranged in or on the holding element.

According to another example, the magnetically transmitting element may be arranged in or on a valve in order to determine the switching position of a valve as shown in FIG. 1 that operates under a high voltage and can be switched in a remote-controlled fashion, wherein the movable valve element of said valve can be displaced between two switching positions and releases the path for a medium flowing through the valve in one switching position while said path is blocked when the valve element is situated in the other switching position. In this case, the magnetically transmitting element is arranged in a component that can be displaced with the valve element, and the sensor element is arranged in or on a component of the valve that remains stationary relative to the valve element. This may, in particular, pertain to the inquiry of the position of the master needle valve in an electrostatic atomizer described in DE 101 15 472, which is incorporated herein by reference.

The invention claimed is:

1. A sensor system for a conductive coating delivery system subject to high voltage, comprising:
    a movable element including a magnetically acting transmitter element for signaling the position or movement of said movable member, and
    a sensor element responsive to said magnetically acting transmitter element in a portion of said conductive coating delivery system subject to high voltage, said sensor element including an optical polarizing device subject to magneto-optical change upon approach of said magnetically acting transmitter element of said movable member generating a light signal, and
    optical fibers connected to said sensor receiving said light signal connected to an electronic device situated remotely from said high voltage generating an electric signal corresponding to said light signal.

2. The sensor as defined in claim 1, wherein said magnetically acting transmitter element is a permanent magnet.

3. The sensor as defined in claim 1, wherein said sensor element includes a refractor element which turns polarized light located between said polarization device and said reflector.

4. The sensor as defined in claim 1, wherein said conductive coating delivery system includes a delivery line, said movable member is a pig movable through said delivery line and said pig including an embedded permanent magnet.

5. The sensor as defined in claim 4, wherein said conductive coating delivery system includes a pig station receiving said pig and said sensor element is located in said pig station signaling receipt of said pig in said pig station.

6. The sensor as defined in claim 4, wherein said sensor element is located adjacent said delivery line signaling movement of said pig through said delivery line past said sensor element.

7. The sensor as defined in claim 1, wherein said conductive coating delivery system includes a delivery line receiving said movable member and said electronic device is connected to a valve delivering fluid to said delivery line.

8. The sensor as defined in claim 1, wherein said conductive coating delivery system includes an apparatus having a movable member and a stationary member and said sensor element is located on said stationary member.

9. The sensor as defined in claim 8, wherein said conductive coating delivery system includes a metering pump driven by a motor, wherein said magnetically acting transmitter element is located on a rotating component of said metering pump and motor.

10. A sensor system for a conductive coating delivery system, comprising:
    a conductive coating delivery line, a pig movable through said conductive coating delivery line having a magnetically acting transmitter element for signaling a position or movement of said pig, and a sensor element responsive to said magnetically acting transmitter element of said pig in a portion of said conductive coating delivery system subject to high voltage, said sensor element including an optically polarizing device subject to magneto-optical change upon approach of said magnetically acting transmitter element of said pig generating a polarized light signal, optical fibers connected to said sensor element receiving said polarized light signal, and said optical fibers connected to an electrical device situated remotely from said high voltage receiving said polarized light signal and generating an electrical signal.

11. The sensor system as defined in claim 10, wherein said conductive coating delivery system includes a pig station receiving said pig and said sensor element is located in said pig station.

12. The sensor system as defined in claim 10, wherein said sensor element is adjacent said delivery line signaling movement of said pig through said delivery line past said sensor element.

13. The sensor system as defined in claim 10, wherein said electrical device is connected to a valve delivering fluid to said conductive coating delivery line.

14. The sensor system as defined in claim 10, wherein said magnetically acting transmitter element is a permanent magnet embedded in said pig.

* * * * *

UNITED STATES PATENT AND TRADEMARK OFFICE
CERTIFICATE OF CORRECTION

| | | |
|---|---|---|
| PATENT NO. | : 7,110,123 B2 | Page 1 of 1 |
| APPLICATION NO. | : 10/630264 | |
| DATED | : September 19, 2006 | |
| INVENTOR(S) | : Michael Baumann, Siedfrieg Poppe and Hidetoshi Yamabe | |

It is certified that error appears in the above-identified patent and that said Letters Patent is hereby corrected as shown below:

In column 6, line 9, please delete "member" and insert --element--.

In column 6, line 25, please delete "refractor" and insert --refractive--.

In column 6, line 26, please delete "polarization device" and insert --optical polarizing device--.

In column 6, line 30, please delete "member" and insert --movable--.

In column 6, line 43, please delete "member" and insert --movable--.

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,110,123 B2 | Page 1 of 1 |
| APPLICATION NO. | : 10/630264 | |
| DATED | : September 19, 2006 | |
| INVENTOR(S) | : Michael Baumann, Siedfrieg Poppe and Hidetoshi Yamabe | |

It is certified that error appears in the above-identified patent and that said Letters Patent is hereby corrected as shown below:

In column 6, line 30, please delete "member" and insert --element--.

In column 6, line 42, please delete "member" and insert --element--.

Signed and Sealed this

Fourth Day of September, 2007

JON W. DUDAS
*Director of the United States Patent and Trademark Office*